Aug. 29, 1933.  J. D. RYDER  1,924,458
MOTOR CONTROL CIRCUIT
Filed Sept. 3, 1931
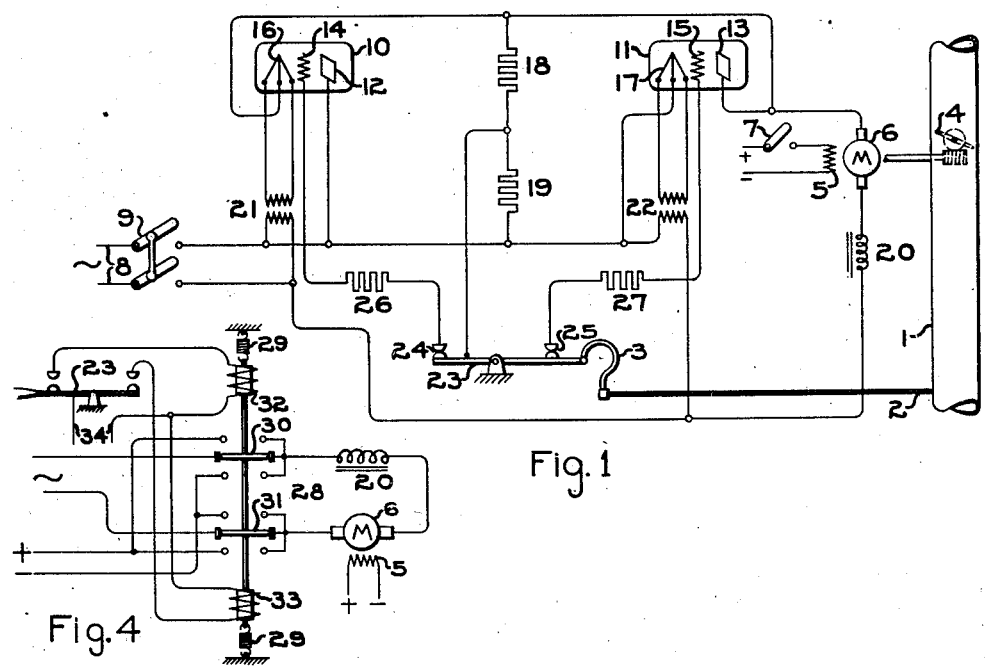
Fig. 1
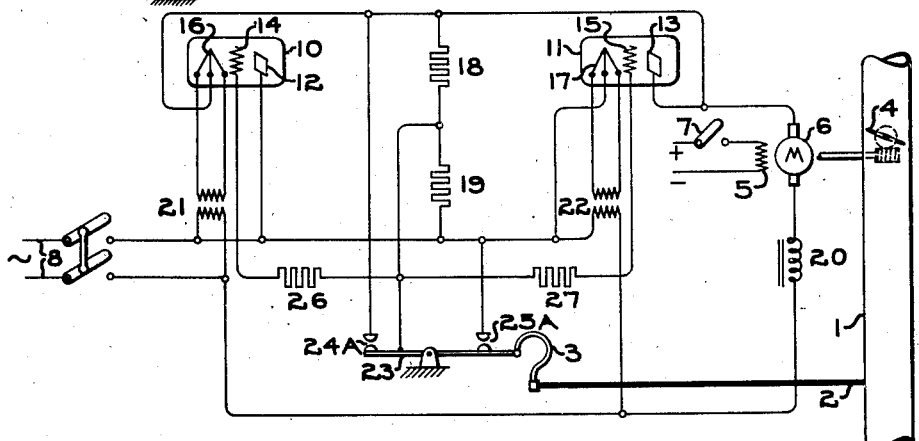
Fig. 2
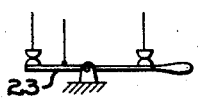
Fig. 3
Fig. 4
INVENTOR
John D. Ryder.
BY
ATTORNEY Patented Aug. 29, 1933

1,924,458

UNITED STATES PATENT OFFICE 1,924,458

MOTOR CONTROL CIRCUIT

John D. Ryder, Cleveland, Ohio, assignor to Bailey Meter Company, a corporation of Delaware Application September 3, 1931. Serial No. 561,005

19 Claims. (Cl. 172—179)

My invention relates to motor control circuits and has special reference to providing an improved system for the starting, reversing, and stopping without appreciable overtravel, of a constant speed motor such, for example, as a direct-current motor.

In the invention I utilize a standard shunt-wound direct-current motor, reconnected so that the field is separately excited with direct-current and the armature of which may be connected in an alternating-current circuit. In normal operation of the motor in one direction or the other, the armature has impressed upon it continuous direct-current or pulsating direct-current, arranged as to polarity for rotation in a desired direction. Substantially instantaneous stoppage of the motor is accomplished through a plugging action obtained by impressing alternating-current across the armature, wherein the opposing torque of the half-cycles of opposite polarity overbalances the torque of rotation.

By the converter action inherent in certain thermionic valves I arrange such valves to allow a pulsating direct-current to flow through the armature circuit in one direction or the other as desired, resulting in rotation of the motor in one direction or the other. Such rotation is initiated by releasing one of the opposing torques from the armature circuit and thereby allowing a pulsating direct-current comprising one-half of the alternating-current wave of desired polarity to flow through the armature. A reversal of rotation of the armature is accomplished through substituting therefor the other half of the alternating-current wave.

A substantially instantaneous stoppage of the motor is accomplished through plugging action by returning the circuit to full-wave alternating-current from pulsating direct-current of either polarity, which application of alternating-current directly across the armature results in a substantially instantaneous stoppage of the armature.

I further provide in my improved motor control circuit means preventing injury to the direct-current motor when full-wave alternating-current is applied across the armature.

The primary object of the invention is in connection with a direct-current energized field, to impress upon the armature of the motor direct-current for rotation of the motor, and when it is desired to stop rotation, substitute for the direct-current impressed upon the armature an alternating-current.

Another object of the invention is to control the direction of rotation of the motor and the plugging thereof through the use of thermionic valves connected in an alternating-current circuit and arranged each to pass one-half of the alternating-current wave.

Further features of the invention will appear from the following description in which certain preferred embodiments of the invention are explained more fully with reference to the accompanying drawing.

In the drawing:

Fig. 1 represents somewhat diagrammatically one embodiment of the invention employing thermionic valves.

Fig. 2 is a similar drawing of a further embodiment employing thermionic valves.

Fig. 3 is a modification of a fragment of Figs. 1 and 2.

Fig. 4 represents diagrammatically the circuit of a further embodiment.

Referring first to Fig. 1, I illustrate as one embodiment of the invention, the automatic operation of a motor control circuit in accordance with the momentary value of a variable to be regulated, such for example as the pressure of a fluid flowing through a conduit 1, which pressure at a point 2 in the conduit is effective for positioning a Bourdon tube 3, and to be maintained substantially uniform through the positioning in the conduit of a damper or valve means 4. For positioning the damper I provide a normally stationary motor having a direct-current excited field 5 and an armature 6 which is connected in an alternating-current circuit. For energizing the field 5 from direct-current source I provide a single pole switch indicated at 7 forming hand operable means for exciting the field.

The main features of this embodiment of the invention lie in the control and supply of alternating-current to the armature 6 of the motor to cause the armature to move in one direction or the other at a constant speed, from a position of rest, and when it is desired to stop such rotation, to accomplish the same with a minimum of overtravel on the part of the armature through the use of plugging or substantially instantaneous stopping.

For the armature 6, I provide a source of alternating-current 8 available through a hand operable two-pole switch 9 to the motor circuit proper. In the armature circuit I provide two oppositely connected three-element electronic discharge devices, such for example as thermionic valves, each having a control grid, wherein if the grid voltage is of proper value, the valve conducts or passes current in one direction. Thus with alternating-current voltage applied, the output of the valve is in each case half-wave pulsating direct-current, and with the valves oppositely connected, one-half of the alternating-current wave passes through one of the valves in a given direction, while the other half of the alternating-current wave passes through the other valve in the opposite direction. Thus with the two valves oppositely connected in parallel with each other and in turn in series with the armature across the source 8 of alternating-current, the valves when both conducting will pass through the armature full wave alternating-current, thereby applying to the armature equal torque in opposite directions, while with only one valve conducting, that valve passes to the armature half-wave pulsating direct current in a given direction.

I indicate such thermionic valves at 10 and 11 having plate anodes 12 and 13, control grids 14 and 15, and heated filament cathodes 16 and 17 respectively. The cathode 16 of the one valve is connected to the anode 13 of the other, while the anode 12 of the one is connected to the cathode 17 of the other. These two interconnecting circuits are joined between the thermionic valves by two resistances 18 and 19 of equal value and connected in series. Their purpose serving to equalize the potential of the grids relative to their respective cathodes and thus insure the motor running at the same speed in both directions.

The first-mentioned circuit joining the cathode 16 to the anode 13 further joins one pole of the armature 6, while the other pole of the armature connects to the source of alternating-current at the switch 9 through a current limiting reactor 20 of the closed core type. The reactance value depending upon the particular motor and alternating-current voltage used. The second-named circuit between the thermionic valves connecting the anode 12 with the cathode 17 is joined to the opposite pole of the alternating-current source switch 9.

For heating the filament cathodes 16 and 17, I provide transformers 21 and 22 respectively, both being connected across the alternating-current supply.

The reactor 20 in the armature circuit serves to protect the armature from excessive heating when alternating-current is impressed directly across the motor as is the case when both thermionic valves 10 and 11 are conducting. When direct-current flows through the motor the reactor saturates and practically all of the voltage exists across the armature for operation of same. On alternating-current, however, the reverse is true, and with practically all of the voltage across the reactor the armature heating is very small.

I provide in connection with the Bourdon tube 3, and to be actuated thereby, a contactor device 23 adapted to be positioned about a fulcrum intermediate its ends by the Bourdon tube, to the end that as shown in the drawing, if pressure within the conduit 1 increases, then the contactor bar 23 will tend to rotate in a counterclockwise direction through actuation from the Bourdon tube, while if pressure within the conduit 1 decreases, rotation in a clockwise direction will occur. The contactor normally is close-circuited at the contacts 24 and 25 joining the grid 14 and the grid 15 with the midpoint between the resistances 18 and 19. In circuit between the grid 14 and contact 24 being a resistance 26, and in circuit between the grid 15 and contact 25 a resistance 27, namely grid current limiting resistances.

With the contacts 24 and 25 normally close-circuited, the valves 10 and 11 are normally conducting when the switch 9 is closed and alternating-current is available at 8. The cathodes 16 and 17 are heated and alternating-current is impressed across the armature 6 for the half-wave of one polarity through the valve 10 and the other half-wave of opposite polarity through the valve 11 due to the opposite connecting of the two valves relative to each other.

When the grid circuit of one of the valves is opened through the opening of the contact 24 or of the contact 25, the corresponding valve becomes inoperative and its alternating current half-wave is no longer impressed across the armature 6 whereby the remaining valve supplies to the armature the other half-wave or a pulsating direct-current of a given polarity for rotation of the armature in a predetermined direction. Should the opposite contact be open-circuited, then the alternate valve is effective and pulsating direct-current of opposite polarity is impressed across the armature for rotation of the same in the opposite direction. Thus from a position of rest of the armature in which is impressed across it alternating-current of full wave value, I may cause a rotation of the motor in one direction or the other by positioning the contactor 23 around its fulcrum and thereby cause an open circuiting of the contact 24 or of the contact 25 in accordance with which direction of rotation I desire for the armature.

Thus in operation, as the pressure of the fluid in the conduit 1 at the point 2 deviates, the said deviation from the desired value is felt upon the Bourdon tube 3 for positioning the contactor 23 from a predetermined position corresponding to a given pressure. Such positioning will cause an open-circuiting of either the contact 24 or the contact 25 to result in a rotation of the armature in one direction or the other for opening or closing the damper 4 to restore the pressure at 2.

The motor, having a separately excited direct-current field, rotates in desired direction depending upon the polarity of the half-wave of the alternating-current or pulsating direct-current applied to the armature, and at a speed dependent upon the preponderance of the rotating torque over the motor load and friction, and where the rotating torque is the difference between the line-emf and the counter-emf. When alternating-current is applied to the armature, the pulsating current of opposite polarity, comprising the opposite half-wave of the alternating-current, immediately subjects the armature to a stopping torque tending to cause rotation in the opposite direction, and of a value equal to the summation of the line-emf and the counter-emf, or substantially double the value of the rotating torque. Thus the rotating torque is substantially instantaneously opposed by a stopping torque of far greater magnitude and stoppage of rotation occurs substantially instantaneously and without overtravel.

In Fig. 2, I show a further embodiment of my invention wherein the circuit is identical with that of Fig. 1 except that I have provided the contactor 23 with normally open-circuited contacts 24A and 25A rather than with the close-circuited contacts 24 and 25 of Fig. 1. This may be desirable in certain mechanical arrangements or for other reasons, and by very slight changes in the wiring of the circuit I can take care of this requirement. For example, in Fig. 2, I join the resistances 26 and 27 external of the contactor assembly 23, interconnect such circuit with the joining of the resistances 18 and 19, and further connect both of these circuits between the pairs of resistances to the movable bar of the contactor 23. I then connect the open-circuited part of the contact 24A with the circuit joining the cathode 16 and the anode 13, and connect the open circuited part of the contact 25A directly to the circuit which joins the anode 12 with the cathode 17.

With the circuit as shown in Fig. 2, by closing the contact 24A I change the potential on the grid 14 to a value wherein the valve 10 no longer passes current and is ineffective in impressing across the armature the pulsating direct current of related polarity. The same effect is accomplished through close-circuiting the contact 25A with relation to the valve 11.

In Fig. 3, I have shown the contactor 23 capable of being positioned by hand means rather than by the Bourdon tube 3. It is contemplated that the rotation of the motor armature 6 may be accomplished equally well in either direction or stopped in rotation, by hand manipulation of a switch or contactor 23 of either the open-circuited or close-circuited type as well as by the automatic means illustrated in Fig. 1 and Fig. 2, or otherwise.

The invention may be employed with motors wherein the field is energized by pulsating direct-current as well as continuous direct-current. I preferably employ an alternating current at 8 of a value of twice the potential of the direct current controlled by the switch 7 which through the half-wave rectification results in a voltage during rotation of the armature across the armature of approximately 45% of the value of the potential at the source 8 or substantially the same potential as is applied to the field 5. It is not necessary, however, that such voltage relationship obtain between the field and the armature, for by varying such relationship as well as other adjustments of the circuit, I may vary the basic speed of the motor.

In Fig. 4, I illustrate an embodiment of my invention wherein I cause a continuous direct-current to be applied across the armature for rotation of the motor, but impress alternating-current across the armature when it is desired to stop rotation and accomplish the stoppage with a minimum of overtravel. I have shown an arrangement through the use of which I control a relay for impressing upon the armature direct-current of proper polarity relative to the armature for causing a rotation of the armature in one direction or the other, and when the relay is de-energized to thereby disconnect the armature from the direct-current supply there is connected across the armature alternating-current for applying to the armature equal and opposing torques to cause a stoppage of the armature with a minimum of overtravel. At 28, I indicate generally a relay having its movable parts urged normally to a central position as shown by the springs 29. In the shown central position the contact bars 30 and 31 connect the armature 6 to a source of alternating-current whose equal and opposing torque applied across the armature 6 causes same to remain stationary against rotation and to assume such condition practically instantaneously upon the application thereto of the alternating-current.

The relay 28 is provided with solenoids 32 and 33, the former adapted when energized to cause a movement of the contact bars 30 and 31 downwardly, and the latter when energized adapted to cause a movement of the contact bars 30 and 31 upwardly (on the drawing). The contactor 23 which may be positioned by hand or in a manner such as is illustrated in Fig. 1 and Fig. 2, is connected in a current source 34 which may be alternating-current or direct-current, as desired. The arrangement is such that when the contactor 23 is positioned in a clockwise direction an energization of the solenoid 32 is accomplished for movement of the contact bars 30 and 31 downward, whereas if the contactor 23 is moved in a counter-clockwise direction the solenoid 33 is energized for upward positioning of the contact bars 30 and 31.

When the contact bars 30 and 31 are positioned upwardly or downwardly from their central position, they are arranged to close circuits across contact points between a source of direct-current and the terminals of the armature 6 to the end that if the solenoid 23 is energized the armature will have impressed direct-current of proper polarity to cause a rotation of the armature in one direction, whereas if the solenoid 33 is energized, the resulting rotation of the armature 6 will be in the opposite direction.

Assume, for example, that the solenoid 32 is energized and the armature 6 is rotating in a desired direction. If it is desired to stop the armature from rotating, the contactor 23 is moved to a position wherein the solenoid 23 is de-energized, and such de-energization makes effective upon the relay the springs 29 to position the contact bars 30 and 31 in their mid-position substantially instantaneously, impressing across the armature 6 alternating-current.

In any of the embodiments described or others which may be employed to function with my invention desirable values of resistances, reactance, etc. may be used and the invention is not limited to definite values thereof. I contemplate broadly a circuit of the nature disclosed, wherein normally a motor is caused to rotate in a desired direction through the impressing upon its armature of direct-current, and wherein when no rotation is desired, the motor has alternating-current impressed across its armature wherein the armature remains without rotation and without damage through excessive heating. It will be apparent that after having stopped the rotation of the armature by plugging the same, through the application across the armature of alternating-current, it is not essential that the alternating-current remain connected across the armature. Its connection to the armature may be only for a relatively short length of time to cause a stoppage of rotation of the armature, after which it may be, if desired, disconnected from the armature.

When desired and through the functioning of the particular apparatus and arrangement of same, a pulsating direct-current of one polarity or the other may be impressed across the armature of the motor to cause a rotation thereof in a desired direction. Furthermore, when it is desired to stop the motor, the motor is plugged by the throwing across the armature of alternating-current of full-wave value rather than half-wave value of one polarity or the other, and thus through the application of a greater opposing torque the motor is substantially instantaneously plugged to a standstill without overtravel or creep.

Throughout the specifications and claims where I speak of direct-current or alternating-current, I use these terms in the commonly accepted manner and meaning. By direct-current I mean a unidirectional flow, be it continuous, intermittent or pulsating, and by alternating-current I mean one wherein the flow periodically alternates as to direction or polarity.

Having thus described certain preferred embodiments of my invention, I desire it to be understood that I am not to be limited thereby except as claimed in view of prior art.

What I claim as new and desire to secure by Letters Patent of the United States, is:—

1. A method of stopping rotation of a direct-current energized motor armature whose related field is separately excited with direct-current which includes substituting alternating-current energization for the direct-current energization.

2. A method of controlling an electric motor which consists in separately exciting the field of the motor with direct-current, impressing across the armature of the motor direct-current for causing a rotation of the armature, and substituting alternating-current for the direct-current impressed across the armature when it is desired to stop rotation of the armature.

3. A method of controlling an electric motor which consists in separately exciting the field of the motor with direct-current, impressing across the armature of the motor pulsating direct-current in proper direction for causing rotation of the armature in desired direction, and substituting alternating-current for the pulsating direct-current when it is desired to stop rotation of the armature.

4. A control circuit comprising in combination, a motor having a field winding and an armature, a source of direct-current for energizing the field winding, a source of alternating-current, the armature connected in the alternating-current circuit, two thermionic valves in the armature circuit, such valves oppositely connected in parallel with each other and in series with the armature, the valves normally effective to pass full wave alternating-current to the armature for opposing equal torques whereby the armature is not urged to rotation.

5. A control circuit comprising in combination, a motor having a field winding and an armature, a source of direct-current for energizing the field winding, a source of alternating-current, the armature connected in the alternating-current circuit, two thermionic valves in the armature circuit, such valves oppositely connected in parallel with each other and in series with the armature, the valves normally effective to pass full-wave alternating-current to the armature for opposing equal torques whereby the armature is not urged to rotation, and means for making ineffective one of said valves to effect a rotation of the armature in one direction.

6. A control circuit comprising in combination, a motor having a field winding and an armature, a source of direct-current for energizing the field winding, a source of alternating-current, the armature connected in the alternating-current circuit, two thermionic valves in the armature circuit, such valves oppositely connected in parallel with each other and in series with the armature, the valves normally effective to pass full-wave alternating-current to the armature for opposing equal torques whereby the armature is not urged to rotation, and means for selectively making ineffective either of said valves to effect a rotation of the armature in a desired direction.

7. A control circuit comprising in combination, a motor having a field winding and an armature, a source of direct-current for energizing the field winding, a source of alternating-current, the armature connected in the alternating-current circuit, two thermionic valves in the armature circuit, such valves oppositely connected in parallel with each other and in series with the armature, a reactor in series with the armature and the paralleled valves, one valve effective to pass half of the alternating-current wave to the armature, the other valve normally effective to pass the opposite half of the alternating-current wave to the armature, the two half-waves impressed upon the armature providing opposing equal torques whereby the armature is not urged to rotation, and means for making ineffective one of said valves to make ineffective the torque in one direction whereby the motor rotates at a constant speed in the opposite direction.

8. A control circuit for a motor having a field winding and an armature, a source of direct-current for the field winding, a source of direct-current and a source of alternating-current for the armature, and means for selectively connecting the armature to one of said last two named sources.

9. A control circuit for a motor having a field winding and an armature, a source of direct-current for the field winding, a source of direct-current and a source of alternating-current for the armature, and means responsive to the momentary value of a variable to be controlled for selectively connecting the armature to one of said last two named sources.

10. A method of stopping rotation of a motor armature energized with pulsating direct-current and whose related field is separately excited with direct-current, which includes, substituting alternating-current energization of the armature for the pulsating direct-current energization.

11. The method of controlling an electric motor whose field is separately excited with direct-current, which includes, impressing across the armature of the motor pulsating direct-current for causing rotation of the armature, and substituting alternating-current for the pulsating direct-current when it is desired to stop armature rotation.

12. The method of controlling an electric motor whose field is separately excited with direct-current, which includes, impressing across the armature of the motor direct-current selectively as to direction for causing rotation of the armature in desired direction, and substituting alternating-current for the direct-current when it is desired to stop armature rotation.

13. A control circuit for a motor having an armature circuit and a separate field winding, a source of direct-current for the field winding, a source of pulsating direct-current and a source of alternating-current for the armature circuit, and means for selectively making effective upon the armature one of said last two named sources.

14. A control circuit comprising in combination, a motor having a field winding and an armature, a source of direct-current for energizing the field winding, a source of alternating-current, the armature connected in the alternating-current circuit, and a plurality of electronic discharge devices connected in the armature circuit, said devices normally effective to pass full wave alternating-current to the armature for opposing equal torques whereby the armature is not urged to rotation.

15. A control circuit comprising in combination, a motor having a field winding and an armature, a source of direct-current for energizing the field winding, a source of alternating-current, the armature connected in the alternating-current circuit, a plurality of electronic discharge devices connected in the armature circuit, said devices normally effective to pass full wave alternating-current to the armature for opposing equal torques whereby the armature is not urged to rotation, and means for making ineffective one of said devices to effect a rotation of the armature in one direction.

16. A control circuit comprising in combination, a motor having a field winding and an armature, a source of direct-current for energizing the field winding, a source of alternating-current, the armature connected in the alternating-current circuit, a purality of electronic discharge devices connected in the armature circuit, said devices normally effective to pass full wave alternating-current to the armature for opposing equal torques whereby the armature is not urged to rotation, and means for selectively making ineffective either of said devices to effect a rotation of the armature in a desired direction.

17. A control circuit for a motor having a field winding and an armature winding, a source of direct-current for the field winding, a source of direct-current and a source of alternating-current for the armature winding, means including electronic discharge devices for selectively impressing upon the armature winding either direct-current or alternating-current, and means for varying the value of the direct-current so impressed.

18. A control circuit for a motor having a field winding and an armature winding, a source of direct-current for the field winding, an alternating-current circuit, the armature winding in said alternating-current circuit, a plurality of electronic discharge devices in the alternating-current circuit, means for selectively making ineffective one of the devices whereby the armature rotates in one direction, and means for controlling the current output of the effective device after one of the devices has been made ineffective for varying the speed of the armature rotation.

19. A control circuit for a motor having a field winding and an armature winding, a source of direct-current for the field winding, a source of direct-current and a source of alternating-current for the armature winding, and means including electronic discharge devices for selectively impressing upon the armature winding either direct-current or alternating-current.

JOHN D. RYDER.